(No Model.) 2 Sheets—Sheet 1.

J. S. COPELAND.
CRANK SHAFT AND ATTACHMENT FOR VELOCIPEDES.

No. 547,949. Patented Oct. 15, 1895.

Attest:
A. N. Jesbera.
S. H. Irish.

Inventor:
James S. Copeland
by Redding & Kiddle
Att'ys.

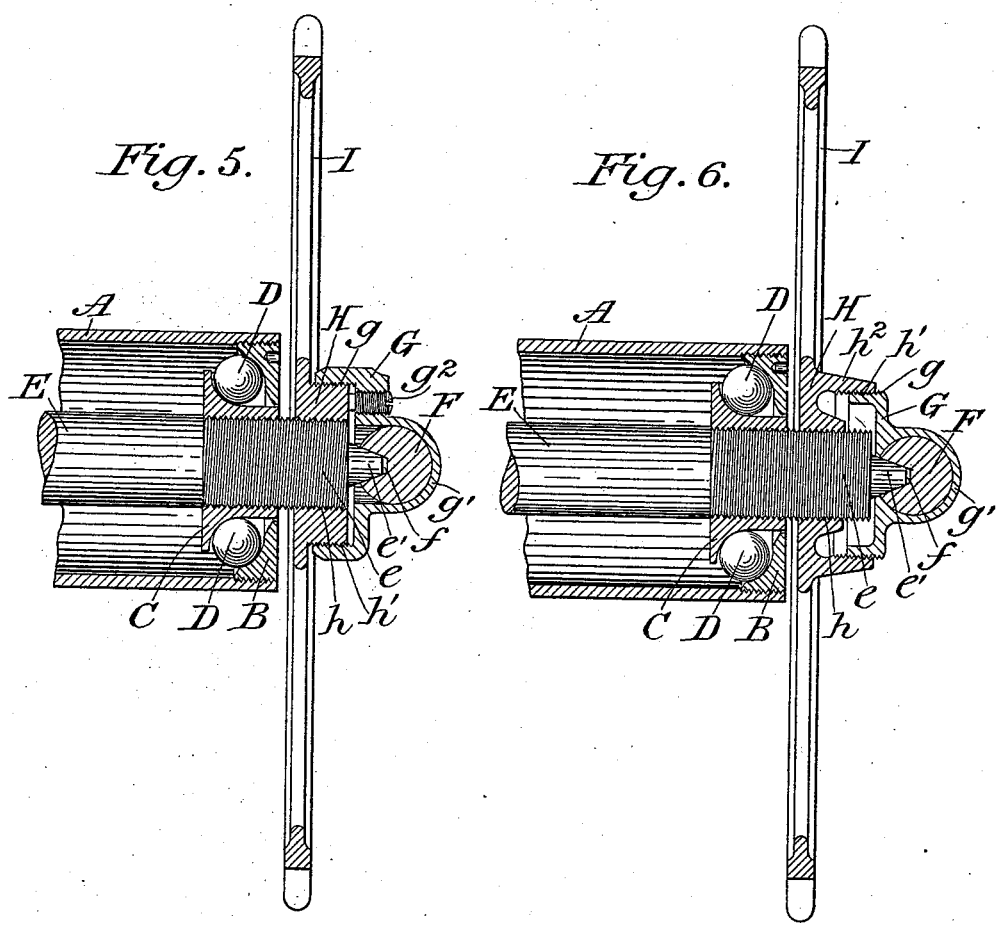

UNITED STATES PATENT OFFICE.

JAMES S. COPELAND, OF HARTFORD, CONNECTICUT, ASSIGNOR TO THE POPE MANUFACTURING COMPANY, OF SAME PLACE AND PORTLAND, MAINE.

CRANK-SHAFT AND ATTACHMENT FOR VELOCIPEDES.

SPECIFICATION forming part of Letters Patent No. 547,949, dated October 15, 1895.

Application filed May 7, 1895. Serial No. 548,370. (No model.)

*To all whom it may concern:*

Be it known that I, JAMES S. COPELAND, of the city of Hartford, county of Hartford, and State of Connecticut, have invented certain new and useful Improvements in Crank-Shafts and Attachments for Velocipedes, &c., of which the following is a specification, reference being had to the accompanying drawings, forming a part hereof.

This invention relates particularly to the crank-shafts and attachments thereof of velocipedes and other like vehicles, and has for its object to provide improved means for attaching the crank and also the usual gear or sprocket wheel to the crank-shaft, which means shall not only permit the crank to be removed or replaced therein, but shall secure a firm and strong attachment with a minimum of material and therefore of weight and shall prevent any loosening of the parts in back-pedaling.

The features in which the invention consists will be particularly set forth in the claims which follow hereinafter, and will be fully explained herein with reference to the accompanying drawings, forming part hereof, in which several embodiments of the invention are illustrated.

Figure 1:
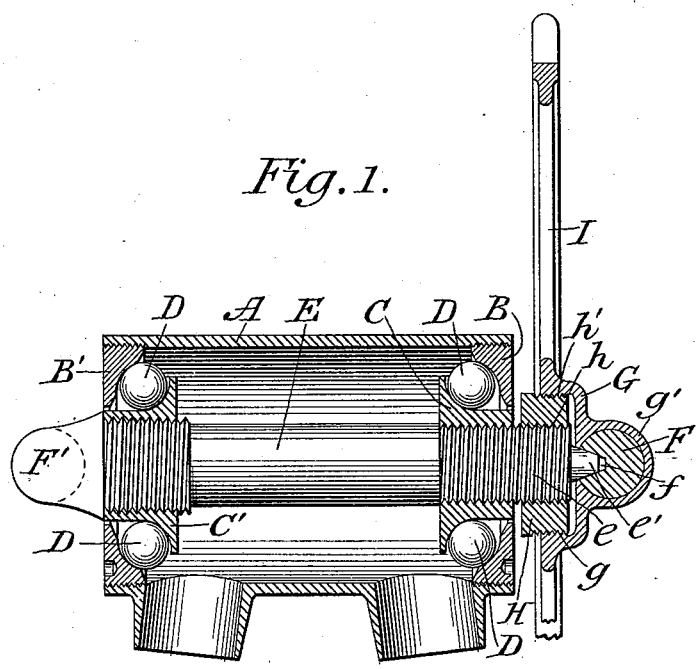
Figure 2:
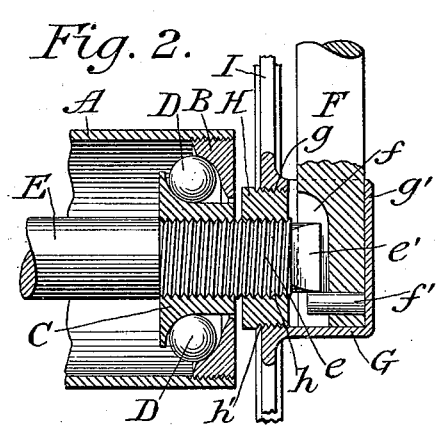
Figure 3:
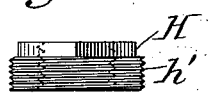
Figure 4:
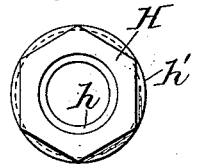

In the drawings, Figure 1 is a longitudinal central section on a horizontal plane through a crank-shaft bracket of a bicycle, the crank-shaft being shown in plan view and the crank and sprocket wheel or gear and the devices for attaching them to the crank-shaft being shown in section, with the sprocket-wheel partly broken away to save space. Fig. 2 is a partial view similar to Fig. 1, the plane of section being at right angles to that of Fig. 1. Fig. 3 is an edge view of the nut shown in Figs. 1 and 2. Fig. 4 is a plan view of the same. Figs. 5 and 6 are partial sectional views similar to Fig. 2, but illustrating different arrangements.

The construction of the crank-shaft bracket and of the bearings for the crank-shaft is not material to the present invention, but as indicated in the drawings may be of any usual or suitable arrangement. As represented in Figs. 1, 2, 5, and 6, the crank-shaft bracket A may be screw-threaded at its end to receive the cases B B' of the usual ball-bearings. The cones C C', between which and the cases B B' are placed the balls D D, may also, as usual, be screwed upon the crank-shaft E or otherwise fixed in position thereon, adjustment of the bearings being effected by adjustment of the cases B B'. Preferably the left-hand crank F' is made in one piece with the crank-shaft E, and for convenience in assembling the parts the threaded portion of the shaft at the left-hand end is of greater diameter than that at the right end, so that the left cone C' may be slipped over the right end of the shaft, abutting when screwed home against a shoulder formed by the head of the crank F', while the right cone C abuts against a shoulder formed on the shaft itself. It will be understood, however, that this invention is not directly concerned with the parts thus far referred to and that they may be of any suitable construction and arrangement.

Referring first to the general features of construction, which are common to all of the several forms shown, it will be seen that at or near its end the shaft E is screw-threaded, as at $e$. For convenience the diameter and pitch may be the same as the diameter and pitch of the portion which receives the cone C, as indicated in the drawings; but it will be apparent that the thread might be otherwise formed, if desired. The extremity of the shaft E, preferably beyond the threaded portion $e$, is also formed or adapted for engagement with the crank F in a manner to prevent relative rotation of the shaft with respect to the crank. The shaft and crank may be variously formed for this purpose; but preferably the extremity of the shaft is provided with a tenon $e'$ to enter and engage a corresponding mortise $f$, formed in the inner side of the crank F. The crank F is supported in position for engagement with the shaft E by a carrier $G'$ or $G^2$, which is connected to the shaft by a nut $H'$ or $H^2$. The latter has one threaded portion $h$ to engage the shaft E and another threaded portion $h'$ to engage the corresponding threaded portion $g$ of the carrier $G'$ or $G^2$, whereby the rotation of the nut moves the carrier and with it the crank into engagement with the shaft. I have illustrated in the drawings some of the possible arrangements of the nut-carrier and crank, and I will now proceed to describe these different arrangements with particular reference to the figures of the drawings in which they are severally shown.

Referring first to Figs. 1, 2, 3, and 4, it will be noted that the carrier G has formed with it the gear or sprocket wheel I, and that it has also a socket $g'$, transverse to the axis of the shaft G for the reception of the end of the crank F. The nut H has an interior thread $h$ and an exterior thread $h'$ for engagement, respectively, with the shaft E and the carrier G, the threading of the nut being preferably right and left, although it may be differential. The nut is also formed for engagement by a wrench or other suitable tool for rotation. For convenience in manufacture the mortise $f$ of the crank F is extended to the end of the crank, and a pin $f'$ may be inserted through the crank to prevent positively the withdrawal of the crank from the socket by the engagement of the pin with the tenon $e'$. In assembling the parts referred to above, after the shaft is in position in its bearings within the bracket, the nut H is started on the end of the crank-shaft with a turn or two. The crank is then slipped into the socket $g'$ and the pin $f'$ is put in place. The carrier G is then held in position to be engaged by the nut H, and the latter is rotated by means of a wrench or other tool, being screwed up both upon the shaft and into the carrier, thereby drawing the crank against the end of the shaft, where it is held from rotation by the co-operation of the tenon and mortise. As the crank is thus held positively from rotation with the said shaft and as the sprocket-wheel is fixed with respect to the crank it is impossible to loosen the parts by back-pedaling. In case differential threads are used instead of right and left the pin $f'$ should be removable and should not be inserted in its socket until the parts are almost in place.

In the construction shown in Figs. 5 and 6 the sprocket-wheel $I'$ or $I^2$ is carried by and preferably formed integral with the nut $H'$ or $H^2$. The carrier $G'$ or $G^2$ has a socket $g'$ for the reception of the crank, as before, and is also provided with a check-screw $g^2$, the same being shown in Fig. 5 alone. In the construction shown in Fig. 5 the carrier $G'$ has an internal thread $g$ for engagement with an external thread $h'$ on the nut $H'$, while in the form shown in Fig. 6 the nut $H^2$ has an annular flange $h^2$, within which is formed a thread $h'$ for engagement with a corresponding external thread $g$ on the carrier $G^2$, the threading of the nut being preferably differential, although it may be right and left. In assembling these parts the carrier $G'$ or $G^2$ is screwed upon or into, as the case may be, the nut $H'$ or $H^2$, and the latter is then screwed onto the crank-shaft as far as it will go, while still permitting the introduction of the end of the crank F into the socket $g'$. The crank is then introduced and is brought home against the end of the crank-shaft by a further rotation of the nut $H'$ or $H^2$. Inasmuch as the sprocket-wheel $I'$ or $I^2$ in these two forms is carried with the nut $H'$ or $H^2$ it is apparent that back-pedaling might occasion the rotation of the sprocket-wheel with reference to the crank-shaft but for the provision of the locking device—such, for example, as the check-screw $g$. (Shown in Fig. 5.) When the parts have been assembled, as already described, the check-screw $g^2$, being borne by the carrier $G'$, is screwed in until it bears against the face of the nut $H'$. As the carrier $G'$ is held from rotation by the positive engagement of the crank-shaft and crank it is evident that backward rotation of the nut $H'$ will be prevented. It is obvious that various forms of checking or locking devices might be employed.

It will be obvious that the invention may be embodied in many other forms than those shown herein, and it is therefore to be understood that I do not intend to limit the invention to the exact constructions and arrangements shown.

What I claim, and desire to secure by Letters Patent, is—

1. The combination with a crank shaft having a screw-threaded end and a crank, the said crank shaft and crank being adapted for engagement to prevent relative rotation, of a carrier having a screw-threaded portion and having a socket transverse to the axis of the shaft for the reception of the crank, and a nut formed to engage said crank shaft and said carrier and adapted by its rotation to draw the crank into engagement with the crank shaft, substantially as shown and described.

2. The combination with a crank-shaft having a screw threaded end and a crank, the said crank having in its end a mortise open at one end and the crank-shaft having a tenon for engagement with said mortise, and a pin adapted to be inserted through said crank into said mortise to prevent the withdrawal of the crank, of a carrier having a screw threaded portion and having a socket transverse to the axis of said shaft for the reception of the crank, and a nut formed to engage said crank shaft and said carrier and adapted by its rotation to draw the crank into engagement with the crank shaft, substantially as shown and described.

3. The combination with a crank-shaft having a screw threaded end and a crank, the said crank-shaft and crank being adapted for engagement to prevent relative rotation, of a carrier having a screw threaded portion and having a socket transverse to the axis of the shaft for the reception of the crank, a gear wheel integral with said carrier, and a nut formed to engage said crank-shaft and said carrier and adapted by its rotation to draw the crank into engagement with the crank shaft, substantially as shown and described.

4. The combination with a crank-shaft having a screw threaded end and a crank, the said crank-shaft and crank being adapted for engagement to prevent relative rotation, of a carrier having an internally screw threaded portion and having a socket transverse to the axis of the shaft for the reception of the crank and a nut internally threaded to engage said crank shaft and externally threaded to engage said carrier and adapted by its rotation to draw the crank into engagement with the crank shaft, substantially as shown and described.

This specification signed and witnessed this 4th day of May, A. D. 1895.

JAMES S. COPELAND.

In presence of—
C. E. HAWLEY,
H. R. KENNEDY.